July 11, 1933. C. E. RUTHERFORD 1,917,950
ELECTRICAL CONDUIT FITTING
Filed Sept. 10, 1931
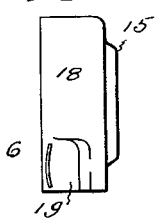
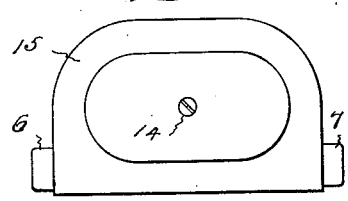
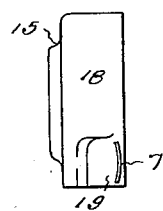
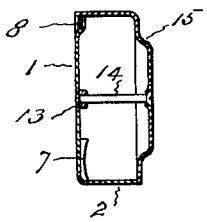
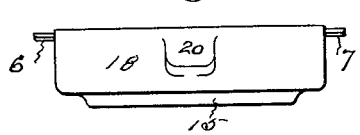
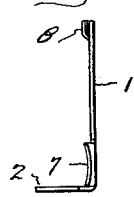
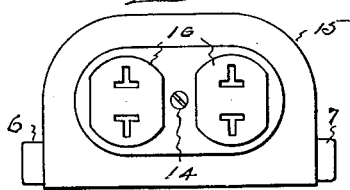
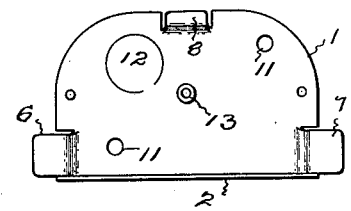
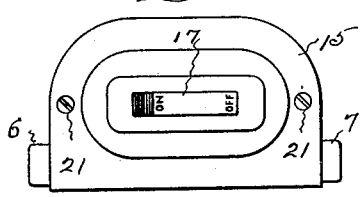
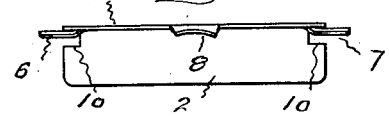
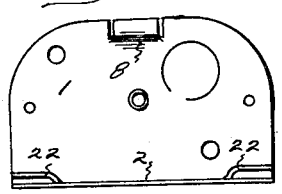
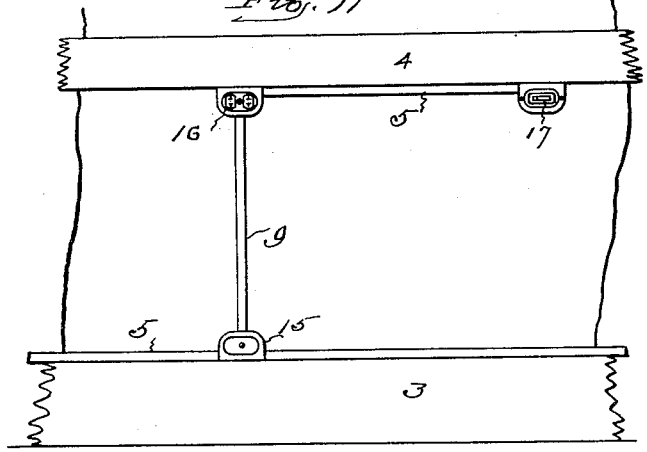
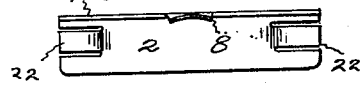
INVENTOR
Charles E. Rutherford,
by
Harry R. Williams,
Atty.

Patented July 11, 1933

1,917,950

UNITED STATES PATENT OFFICE

CHARLES E. RUTHERFORD, OF WEST HARTFORD, CONNECTICUT, ASSIGNOR TO THE WIREMOLD COMPANY, OF ELMWOOD, CONNECTICUT, A CORPORATION OF CONNECTICUT

ELECTRICAL CONDUIT FITTING

Application filed September 10, 1931. Serial No. 562,088.

This invention relates to a slip-joint surface-raceway-conduit fitting for electrical conductors.

The object of the invention is to provide a fitting adapted for use as a junction box, plug receptacle box, or switch box, which is so constructed that the conduit connected to it may be run close against a base board, a door frame, a window casing, a chair rail, and the like trim of a room and give the appearance of being an element thereof.

The structure designed to accomplish this end has a base plate adapted to support a connection block, a plug receptacle, or a switch, with tongues extending in line with each other from opposite edges at or near the bottom of the plate, and a cover for enclosing the connection block, receptacle or switch, that has twist-outs formed in line with each other at the bottom of the back edge of the cover in such positions that the ends of conduit may be engaged with the tongues of the base plate and extended into the fitting through openings made by removing the twist-outs. When thus connected the running lengths of the conduit will be in line with each other at the back of the bottom of the fitting, or, in other words, the fitting is so constructed that it will be offset above or below the running lengths of the conduit to which it is connected.

Besides the base straight line tongues, and cover straight line twist-outs, tongues and twist-outs are preferably formed on the respective parts so that a conduit may be connected to run at right angles to the straight line conduit. The base plate may also have one or more knockouts which when removed will permit the entrance of circuit wires that are concealed in the wall to which the fitting is applied.

In the accompanying drawing Fig. 1 shows a front view of a fitting as designed for a junction box. Fig. 2 is a view of one edge of the same. Fig. 3 is a view of the other edge of the same. Fig. 4 is a top view of the fitting. Fig. 5 is a transverse section of the fitting. Fig. 6 is an edge view of the base plate. Fig. 7 is a front view of the base plate. Fig. 8 is a top view of the base plate. Fig. 9 is a view of the fitting provided with plug receptacles. Fig. 10 shows the fitting provided with a switch. Fig. 11 illustrates one use of these fittings showing a conduit running along the upper edge of a base board and connected with a junction box fitting, a conduit running from the junction box to a plug receptacle fitting beneath the chair rail, and a conduit running along the under edge of the chair rail to a switch fitting. Fig. 12 is a front view of a modified form of the base plate. Fig. 13 is a top view of the modified form of base plate.

In the embodiment of the invention illustrated the base plate which is made of sheet metal is L-shaped, having a back wall 1 that has a straight bottom edge and a dome-shaped top edge, and a bottom wall 2 that extends forwardly from the straight bottom edge of the back wall. When installed for use the back wall is fastened to the wall of the room with the bottom wall close against the edge of the trim, which may be a base board 3, or chair rail 4, along which the conduit 5 is to be run, as indicated in Fig. 11.

The back wall of the base plate illustrated has a tongue 6 that extends sidewise outward from the bottom of one edge, and a tongue 7 that extends sidewise outward from the bottom of the opposite edge. These tongues are slightly offset toward the front so that they may be engaged by the ends of the running lengths of conduit with which they are used, and will hold the running lengths of the conduit closely to the edge of the trim against which the bottom plate of the fitting is placed. Extending upward from the top edge of the back plate is a tongue 8 that is adapted to be engaged by the end of a conduit 9 arranged at right angles to the conduit lengths connected with the other tongues. If the conduit is to extend straight across the fitting the tongues 6 and 7 are employed, and if a right angle extension is required the tongue 8 is utilized, for the attachment of the conduit ends. The edges of the bottom wall of the back plate at the back and near the tongues 6 and 7 have notches 10 cut in them to permit the free engagement of the ends of the conduit. The back wall has perforations 11 for the passage of the means employed to hold it in place, and it may be scored as at 12 to provide a knockout that can be removed to permit the entrance of circuit wires from the wall against which the fitting is placed. The back plate also has an internally threaded stud 13 for receiving a screw 14 that may be employed for securing the cover to the base plate.

The cover 15 is shaped to conform to the back plate, that is, it has a straight bottom and a dome-shaped top. The bottom of the cover is open so as to receive the bottom wall of the back plate. If the fitting is used as a junction box the front of the cover is closed, as shown in Fig. 1. If the fitting is to contain a plug receptacle the front wall of the cover may be provided with one or more openings, as shown in Fig. 9, through which plug receptacles 16 fastened to the base can project. If the fitting is to be used as a switch an opening is made through the front to expose the switch operating thumb piece 17, as shown in Fig. 10.

The edge wall 18 of the cover on each side at the back of the bottom end has a twist-out 19. These twist-outs may be scored for permitting the removal of the amount of metal necessary to permit the insertion of the ends of conduits of different size. The twist-outs are in line with each other in opposite sides of the cover edge wall adjacent to straight line tongues 6 and 7. In the top of the rearwardly extending edge wall of the cover is a twist-out 20 which complements the tongue 8 at the upper edge of the base plate. If the fitting is to encase a junction block, or a duplex plug receptacle a central perforation is made for the passage of the screw 14 which secures the cover to the back of the base plate. If the fitting is to encase a switch it may have perforations for the passage of screws 21 for holding the cover to the base plate. The base plates of the fittings for these several different purposes are exactly the same, and the covers are likewise the same except where it is necessary to have openings for the exposure of plug receptacles or switch operating parts. In the modified form illustrated in Figs. 12 and 13 the construction of the members is the same except that the tongues 22 are stamped from the bottom 2 of the base plate instead of from the back 1 of the base plate.

When a fitting formed as herein described is fastened in place of use the conduit which is connected therewith is held close to the edge of the trim, whether it be a base board, chair rail, door casing or window casing, and it may be colored to harmonize with the adjacent trim so as to give the appearance of being an element of the trim.

The invention claimed is:

1. An electric conduit fitting comprising a casing having a closing plate, said closing plate having a straight edge portion, tongues on said closing plate adjacent said flat edge portion, said tongues extending outwardly from said closing plate in opposite directions and adapted to receive the ends of conduits whereby the edges of said conduits adjacent the flat edge portion of said closing plate are connected so as to be in substantially the plane of said flat edge portion in order to provide a continuous flat surface, and means for mounting suitable electric devices within said casing.

2. An electric conduit fitting comprising a closing plate having a flat portion extending at right angles thereto, tongues on said closing plate adapted to receive conduit ends, said tongues extending in alignment with one another and in opposite directions from said closing plate, a casing having openings coincident with said tongues to permit the connection of said tongues with said conduit ends whereby the edges of said conduits adjacent the said flat portion remain in substantially the plane of said flat portion, and means for mounting suitable electric devices on said closing plate.

3. An electric conduit fitting comprising a closing plate having a flat portion extending at right angles thereto, tongues on said closing plate adapted to receive conduit ends, said tongues being disposed adjacent said right angled flat portion and extending outwardly in opposite directions from said closing plate whereby, when said conduit ends are secured to said tongues, the edges of said conduits adjacent said flat portion extend outwardly in substantially the plane of said flat portion, means for mounting suitable electric devices on said closing plate, and a casing adapted to be secured to said closing plate, said casing having twist-outs coincident with said tongues and openings therein to permit access to said devices.

CHARLES E. RUTHERFORD.